(12) United States Patent
Linke (10) Patent No.: US 8,683,951 B2
(45) Date of Patent: Apr. 1, 2014

(54) INSECT RESISTANT PET FOOD VESSEL

(76) Inventor: Gregory David Linke, Gawler East (AU)

( * ) Notice: Subject to any disclaimer, the term of this patent is extended or adjusted under 35 U.S.C. 154(b) by 0 days.

(21) Appl. No.: 13/132,982

(22) PCT Filed: Sep. 23, 2009

(86) PCT No.: PCT/AU2009/001259
§ 371 (c)(1),
(2), (4) Date: Jul. 27, 2011

(87) PCT Pub. No.: WO2010/065983
PCT Pub. Date: Jun. 17, 2010

(65) Prior Publication Data
US 2011/0283947 A1    Nov. 24, 2011

(30) Foreign Application Priority Data
Dec. 8, 2008  (AU) .................. 2008906326

(51) Int. Cl.
*A01K 5/00*     (2006.01)
(52) U.S. Cl.
USPC ..................... 119/61.53; 119/61.5

(58) Field of Classification Search
USPC ............. 119/61.53, 61.5; D30/129, 130
See application file for complete search history.

(56) References Cited

U.S. PATENT DOCUMENTS

| | | | | |
|---|---|---|---|---|
| 4,803,954 A | * | 2/1989 | Welch et al. | 119/61.53 |
| 4,905,629 A | * | 3/1990 | Hand et al. | 119/61.53 |
| 4,981,108 A | * | 1/1991 | Faeroe | 119/61.53 |
| 5,031,575 A | * | 7/1991 | Phillips | 119/61.53 |
| 5,069,166 A | * | 12/1991 | Ahuna | 119/61.53 |
| 5,205,242 A | * | 4/1993 | Kasselman | 119/61.53 |
| 5,619,952 A | * | 4/1997 | Walker | 119/61.53 |
| 5,647,299 A | * | 7/1997 | Pearson-Falcon | 119/61.53 |
| 5,775,255 A | * | 7/1998 | Louviere, III | 119/51.5 |
| 5,857,428 A | * | 1/1999 | Gitzen | 119/61.53 |
| 6,478,277 B2 | * | 11/2002 | Winquest | 248/346.01 |
| 2005/0005867 A1 | * | 1/2005 | Hernandez | 119/61.5 |

* cited by examiner

Primary Examiner — Kimberly Berona (57) ABSTRACT

A pet food bowl having an internal food dish surrounded by a reservoir adapted to hold a liquid therein and an overlying shroud extending over the reservoir and spaced from an outer wall of said reservoir, wherein said the shroud includes a face extending over a reservoir surface and outermost skirt extending around and spaced from an outermost reservoir wall.

14 Claims, 7 Drawing Sheets

INSECT RESISTANT PET FOOD VESSEL

FIELD OF THE INVENTION

The present invention relates to an animal food bowl.

BACKGROUND OF THE INVENTION

Various vessels are known for use in presenting food to animals, in both indoor and outdoor applications. Due to the nature of the vessels' consumable contents, they are commonly susceptible to infestation by crawling insects such as ants, which exhibit a predisposition for constantly pursuing new food sources. The insects primarily represent a contamination of the food source, commonly resulting in an animal's unwillingness to consume the food, leading to the food being discarded as waste. Furthermore, insects can also be harmful to the animal by means of ingestion, biting or stinging.

Various approaches have been adopted to provide an insect resistant barrier to the food containment surfaces within the vessel. One method used to provide an insect resistant barrier is by use of water or other suitable liquid, which insects are theoretically unable to either cross, or to leave pheromone trails for subsequent insects to follow.

During the process of an animal consuming food from the vessel, food is regularly displaced from within its intended containment surfaces by the animal muzzling or scratching at the food to gain better access. This food accumulates on other areas of the vessel, on the ground or surfaces adjacent to the vessel.

Food displaced into areas of the vessel other than its intended containment surfaces typically serves to bridge insect resistant barriers such as a liquid body that may exist within the vessel. This bridging can also occur as a result of foreign objects such as airborne debris entering the barrier area or by assuming a position in such a manner as to enable crossing of the barrier area. Additionally, food that comes into contact with the liquid body can quickly foul, and as such may present an undesirable situation if an animal were to consume the fouled food.

Food that is displaced to the ground or surfaces adjacent to the feeding vessel attracts insects that that may not even have contact with the primary food source within the vessel. In this instance, vessels with integrated ant resistant barriers are commonly ineffective. The displaced food results in attracting insects to the general feeding area, leading to further problems such as infestations or undesirable contact with humans and animals.

A further shortcoming of liquid barriers is that a minimum body of liquid is necessary for it to present an effective obstruction to insects. Existing feeding vessel applications using liquid barriers are commonly susceptible to evaporation (insects are generally more prevalent in warm weather) and spilling by means of movement or relocation of the vessel.

The present invention proposes an improvement to previous food bowls.

SUMMARY OF THE INVENTION

Therefore, according to a first aspect of the present invention there is provided an animal food bowl having an internal food dish surrounded by a reservoir adapted to hold a liquid therein and an overlying shroud extending substantially over the reservoir and spaced beyond an outer wall of said reservoir, and with an outermost skirt extending around and spaced from an outermost reservoir wall.

Features of the said shroud are formed in such a way to overcome shortcomings of previous approaches in that:

a) a substantial horizontal catchment surface extends beyond the food bowl containment area in such a way that food displaced from the bowl does not bridge or enter the reservoir barrier or move to surfaces beyond the reservoir barrier, or to the ground thus being accessible to crawling insects; and b) the said catchment surface may optionally include a lip or form on the outer edge to further obstruct food from falling beyond the reservoir barrier; and c) the said catchment surface may preferably be inclined away from the food bowl to promote the return of the food by gravity to the food bowl primary containment area, and furthermore condensed water droplets on the underside of the said catchment surface are also inclined to return to the liquid reservoir; and d) the said shroud includes an outermost skirt extending around and spaced from an outermost reservoir wall and ceasing substantially below the reservoir opening, in such a way that the liquid reservoir is concealed to reduce evaporation and foreign matter is unable to enter or bridge the barrier from a horizontal direction.

The dish and reservoir may be formed as a single component, upon which the shroud is assembled to as a separate component. Alternatively, the dish and shroud may be formed as a single component and assembled upon the reservoir as a separate component.

Preferably, the internal dish comprises of a base that transitions into a surrounding generally upstanding side walls and includes an outermost peripheral rim, said outermost peripheral rim being substantially level with said face of the shroud In one form of the invention where the dish and reservoir are formed as a single component, the reservoir is comprised of an open ended channel and is positioned below and outwardly of an outer wall of the dish, the outer wall of the dish and the reservoir being connected by a ledge whereby an inner wall of the shroud sits on the ledge and is a close fit against the outer wall of the dish.

Optionally, a side wall of the dish is spaced from an inner wall of the reservoir, and optionally includes strengthening surfaces extending therebetween at intervals around the dish.

Preferably, that the reservoir has a high aspect ratio and is constructed such that the surface area of liquid held in the reservoir is modest relative to the overall depth of the liquid so as to further reduce evaporation and spilling when bumped or moved More preferably still, the outer side wall of the reservoir is inclined outwardly to thereby discourage insects from scaling the wall to enter the reservoir.

In an alternative form of the invention there is provided a pet food bowl having an internal food dish surrounded by a reservoir adapted to hold a liquid therein and an overlying shroud extending over the reservoir and spaced from an outer wall of said reservoir, wherein said the shroud includes a face extending over a reservoir surface and outermost skirt extending around and spaced from an outermost reservoir wall wherein said dish includes an internal ledge from which extends, an upper wall section, and wherein said shroud sits on the internal ledge and is a close fit against the inner surface of the upper wall section of the dish.

In some forms of the invention the animal food bowl may include an internally partitioned food dish.

Preferably, the animal food bowl of the invention may include a means of stabilising the bowl against overturing and spillage in the form of a reservoir having a horizontally projecting lowermost stabilising lip in which the shroud extends over the reservoir wall and is spaced therefrom, and is also spaced from and not in contact with the lip.

Alternatively, the animal food bowl of the invention may include a means of stabilising the bowl against overturing and spillage in the form of rubberised feet attached to the base of the bowl or reserviour to thereby create frictional resitance to movement on the ground.

DESCRIPTION OF DRAWINGS

The above and other objects, features, and advantages of the present invention will be apparent from the following detailed description of a preferred embodiment in conjunction with the accompanying drawings. In the drawings.

DESCRIPTION OF THE PREFERRED EMBODIMENT

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers may be used throughout the drawings and the following description to refer to the same and like parts.

Figure 1:
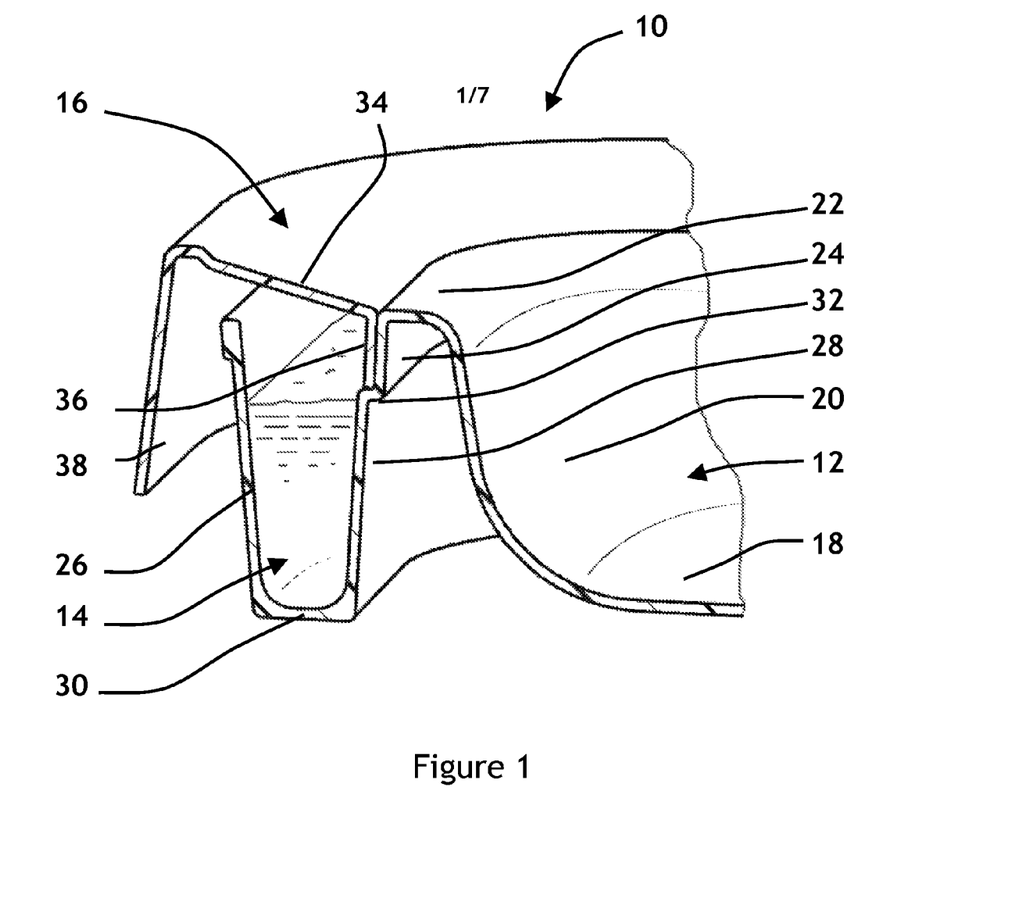
FIG. 1 illustrates in perspective a vertical cross sectional view of an animal food bowl in accordance with a first embodiment of the present invention.
Figure 2:
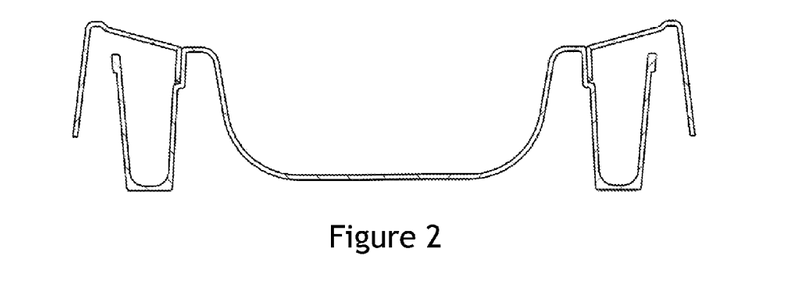
FIG. 2 shows a further vertical cross sectional view of the bowl of FIG. 1.

Shown in FIGS. 1 and 2 is a partial, general cross sectional view of an animal food bowl 10 in accordance with an embodiment of the present invention. The bowl 10 is depicted in the figures in an assembled condition. It is to be appreciated however, that the bowl 10 is adapted for ready assembly/ disassembly for packing, transport, storage or access to the reservoir as needs arise. The bowl 10 includes a generally internal food dish 12, a surrounding reservoir structure 14 and an elevated shroud structure 16. The shroud structure 16 is positioned so as to extend over and around the reservoir 14.

The internal dish 12 and other components of the bowl 10 may be constructed of any of a range of materials that are known for the manufacture of food containers. Conveniently, the various components of the invention may be manufactured from plastics material, from metal or from fired china or earthenware. It should be observed that it is within the spirit and scope of the invention to have the dish 12, shroud 16, or reservoir 14 constructed either as separate individual items that may be connected to one another for use, or, alternatively as a single unit. Similarly, it is possible for the various items of the bowl 10 to be constructed all of the same materials or of different materials. In a particularly convenient form of the invention the dish 12 and reservoir 14 are formed as a single component with a separate shroud element 16 being connected thereto. However, this is not an essential feature of the invention and should not be taken as being limiting thereof.

The internal dish 12 comprises of a base 18 which transitions into a surrounding generally upstanding side walls 20, which, in turn, flattens to an outermost peripheral rim 22 and terminates in an outer wall 24 extending downwardly from the rim 22.

In the embodiment under consideration the dish 12 and reservoir 14 are formed as a single component. The reservoir, accordingly, is comprised of an open ended channel having an outer side wall 26, an inner side wall 28 and a lower base 30. In use, the reservoir is designed for filling with liquid. The reservoir inner side wall 28 is positioned below and slightly outwardly of the outer wall 24 of the dish 12. The outer wall 24 of the dish 12 and inner wall 28 of the reservoir are joined by a ledge 32. As can be seen from the drawings the side wall 20 of the dish 12 is spaced from the inner wall 28 of the reservoir 14. In some embodimentps of the invention a strengthening form may extend between the walls 20 and 28 at intervals, or continuously around the dish 12.

It can also be seen from the drawings that the reservoir 14 has a high aspect ratio and is constructed such that the surface area of liquid held in the reservoir is modest relative to the overall depth of the liquid. By minimising the exposed liquid surface in this way, evaporation from the liquid surface is restricted. Furthermore, the reservoir 14 provides a large capacity so as to be less affected by evaporation, and when filled with liquid the weight of the liquid around the dish 12 assists in adding weight to the bowl and thereby assists in stabilising the bowl 10. Some animals, particularly larger dogs, can, in an overly enthusiastic approach to their food, inadvertently overturn food dishes, which is undesirable. The reservoir of water helps to anchor the bowl 10 and resists any overturning action.

The outer side wall 26 of the reservoir is inclined outwardly. This serves to discourage insects from scaling the wall to enter the reservoir and also discourage debris from accumulating against the wall and bridging the liquid barrier.

The shroud 16 serves as a cover over the reservoir 14. The shroud 16 includes an uppermost face 34 that extends around the dish 12 so as to conceal the reservoir 14 and act as a food catchment surface for displaced food, and connects to an inner wall 36 and outer skirt 38. The inner wall 36 of the shroud 16 sits on the ledge 32 and is a close fit against the outer wall 24 of the dish 12. In the embodiment shown, the shroud and reservoir 14 are both made of plastics material having at least some capacity to flex and so the walls 24 and 36 are an interference fit with one another.

The shroud face 34 is outwardly inclined so as to both encourage any food/liquid dropped on the surface thereof to roll inwardly into the dish 12 and also encourage condensed water droplets on the surface underside to return to the liquid reservoir. The shroud face 34 is, at its inner edge is approximately level with the peripheral rim 22 of the dish 12 and rises to its outer edge where it is spaced above and beyond the outer side wall 26 of the reservoir. Furthermore, the outer skirt 38 of the shroud is also spaced from the outer side wall 26 and from any ground or surface on which the bowl 10 is placed, but also terminates below the opening of the reservoir 27, so as to completely conceal the reservoir 14, thus minimising evaporation or entry of foreign matter.

The shroud face 34 includes an optional ledge 17 to further discourage food which is displaced onto the shroud face 34, from moving beyond the protection of the reservoir barrier 14, or to the adjacent ground.

In use, water is placed in the reservoir 14 and food/water in the dish 12. The shroud 16 is attached and the bowl 10 is ready for use. The shroud 16 effectively serves as a barrier to the reservoir being bridged or contaminated by food from the dish 12 or from external sources. Thus, if any food is dropped by the animal onto the shroud face 34 it is inclined to fall back into the dish 12. Other external contaminants are unable to enter the concealed reservoir 14 to form a bridge across the reservoir. In the event that insects are attracted by the aroma of food the reservoir 14 must be crossed to gain access.

Over time, and more quickly in warmer climates, it also likely that water held in the reservoir will evaporate. As described previously the large liquid volume and reduced surface area helps to reduce the impact of evaporation. The shroud 16 also helps to reduce evaporation by both concealing the reservoir and also, to some extent by acting as a condensation surface which may collect evaporated liquid and return this to the reservoir.

FIGS. 3-10 illustrates various further forms of the invention. It can be readily seen and appreciated, however, that the various forms of the invention all include a bowl having in internal food dish surrounded by a reservoir that, in turn has an overlying shroud extending over and a skirt concealing the reservoir.

Figure 3:
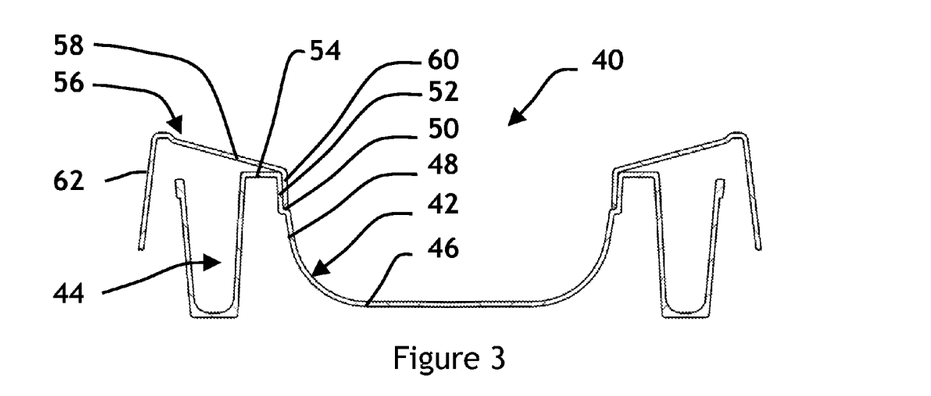
FIG. 3 shows a vertical cross sectional view of an animal food bowl in accordance with a second embodiment of the present invention.

In FIG. 3 there is shown an animal food bowl 40 including internal dish 42 and reservoir 44 formed as a single component. The dish 42 comprises a base 46 that curves to become surrounding generally upstanding side walls 48. The walls 48 of the dish 42 include an internal ledge 50 which, in turn, rise as an upper wall section 52. A generally horizontal rim 54 then connects to the open three side reservoir 44. A shroud 56 serves as a cover over the reservoir 44. The shroud 56 includes an inclined face 58 that extends around the dish 42 so as to generally overlie the reservoir 44 and includes an inner wall 60 and outer skirt 62. The inner wall 60 of the shroud 56 sits on the internal ledge 50 and is a close fit against the inner surface of the upper wall section 52 of the dish 42.

Figure 4:
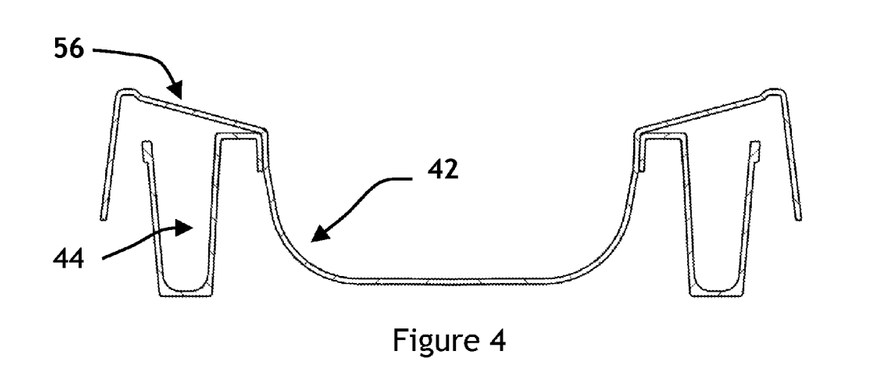
FIG. 4 shows a vertical cross sectional view of an animal food bowl in accordance with a third embodiment of the present invention.

In FIG. 4 there is shown a further embodiment of the present invention where the bowl 42 and shroud 56 are formed as a single component and assemble onto the separate reservoir 44 component.

Figure 5:
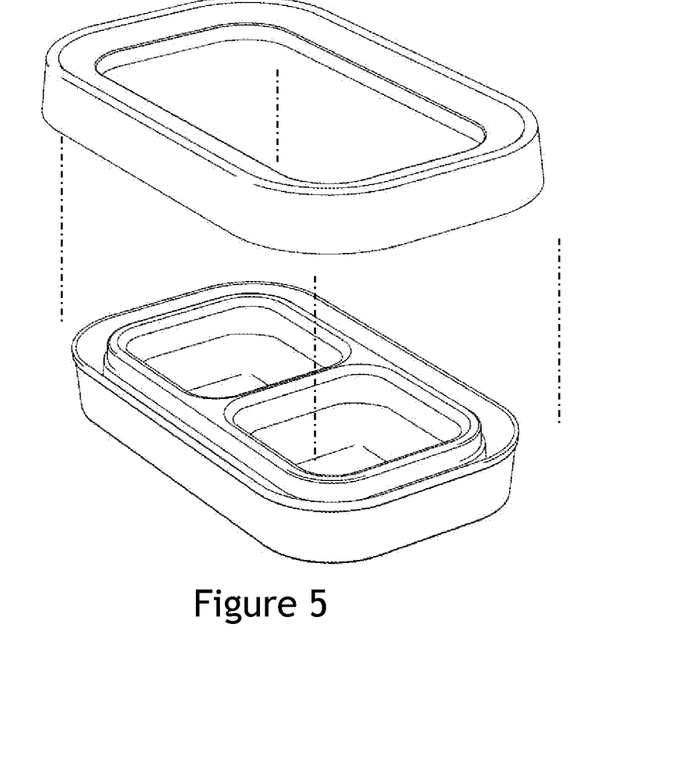
FIG. 5 shows in expanded perspective view an animal food bowl in accordance with a fourth embodiment of the present invention.
Figures 6, 7:
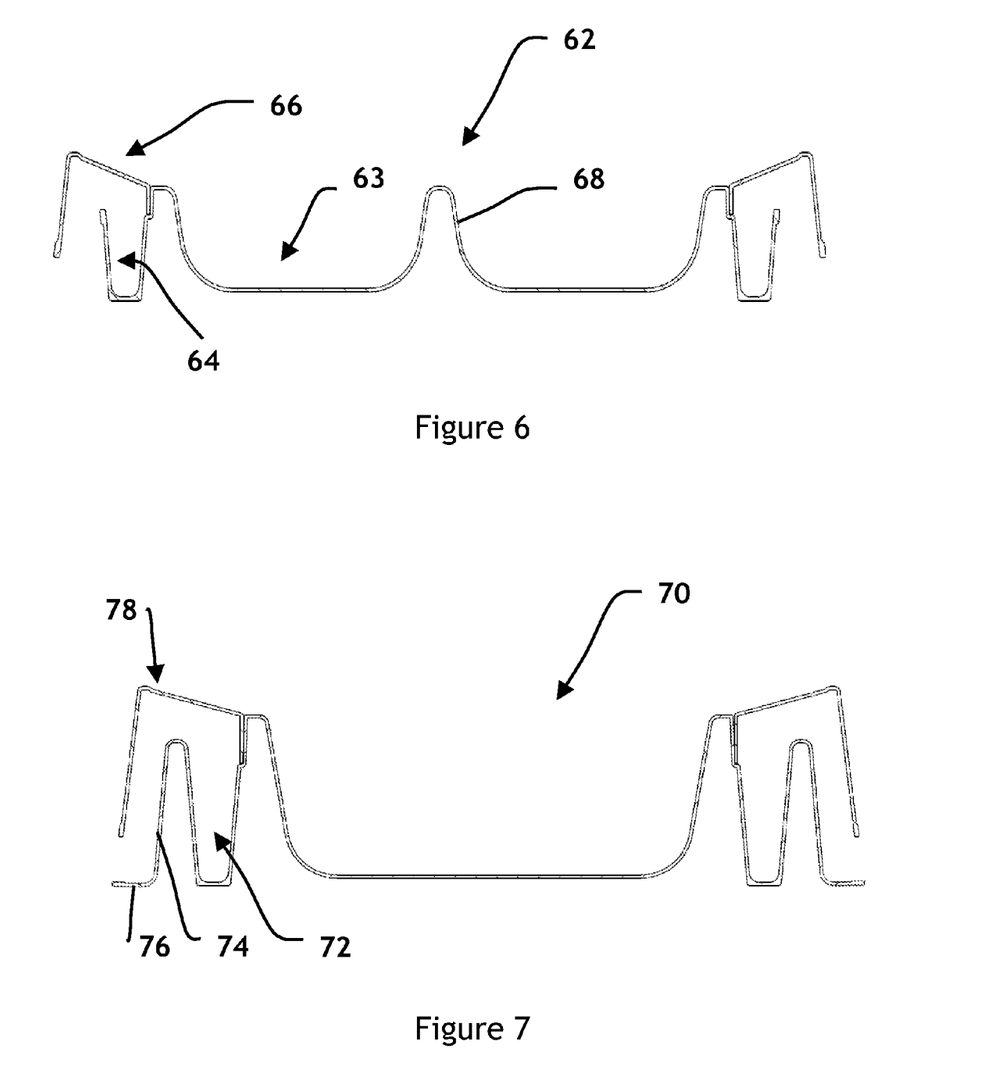
FIG. 6 shows a further vertical cross sectional view of the bowl of FIG. 5
FIG. 7 shows a vertical cross sectional view of an animal food bowl in accordance with a fifth embodiment of the present invention.

In FIGS. 5 and 6 a further embodiment of the present invention is shown in the form of a dual compartment animal food bowl 62 including a dish 63, associated reservoir 64, and a complementary shroud 66. The dish 63 and shroud 66 attached to one another and are constructed in much the same manner as the dish 10 and shroud 16. However, it can be seen that the dish 62 is of a generally rectangular shape and has a dividing central partition 68, thereby allowing for the separation of food or drinking water in the same bowl.

A still further embodiment of the present invention is depicted in cross section only in FIG. 7. As discussed previously, it is helpful in constructing animal food bowls to have a means of stabilising the bowl against overturning and spillage. In the case of the bowl 70 illustrated in FIG. 7, the reservoir 72 includes an outer most wall 74 having a double skin which then leads to horizontally projecting lowermost stabilising lip 76. In this case the shroud 78 extends over the wall 74 and is spaced therefrom, and is also spaced from and not in contact with the lip 76.

Figure 8:
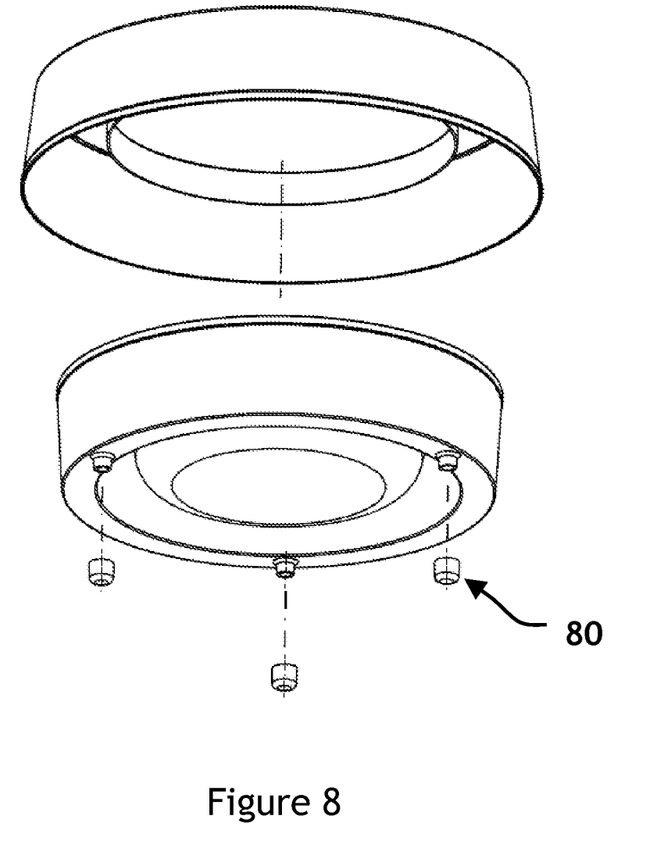
FIG. 8 shows in expanded perspective view an animal food bowl in accordance with a sixth embodiment of the present invention.

An alternative means of stabilising a bowl is also shown in FIG. 8. in this case, there is a plurality of rubberised feet 80 attaced to a base of a bowl to thereby create frictional resistance to movement on the ground.

Figure 9:
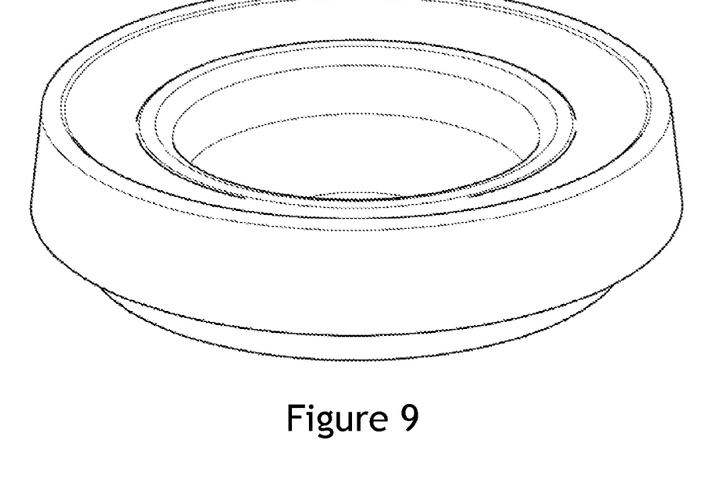
FIG. 9 illustrates the bowl of FIG. 8 in upper perspective view.
Figure 10:
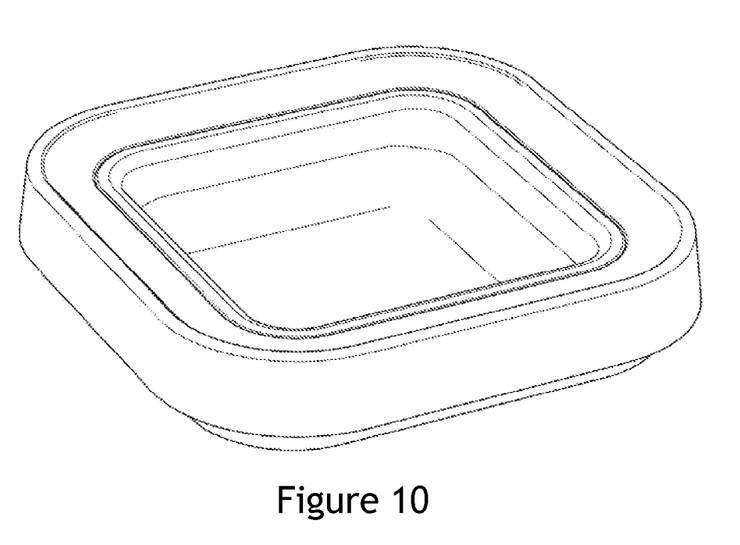
FIG. 10 illustrates a seventh embodiment of the present invention in upper perspective view.

FIGS. 9 and 10 illustrate how the bowl of the invention appears in both square and round profiles, however the configuration lends itself to any general profile.

Figure 11:
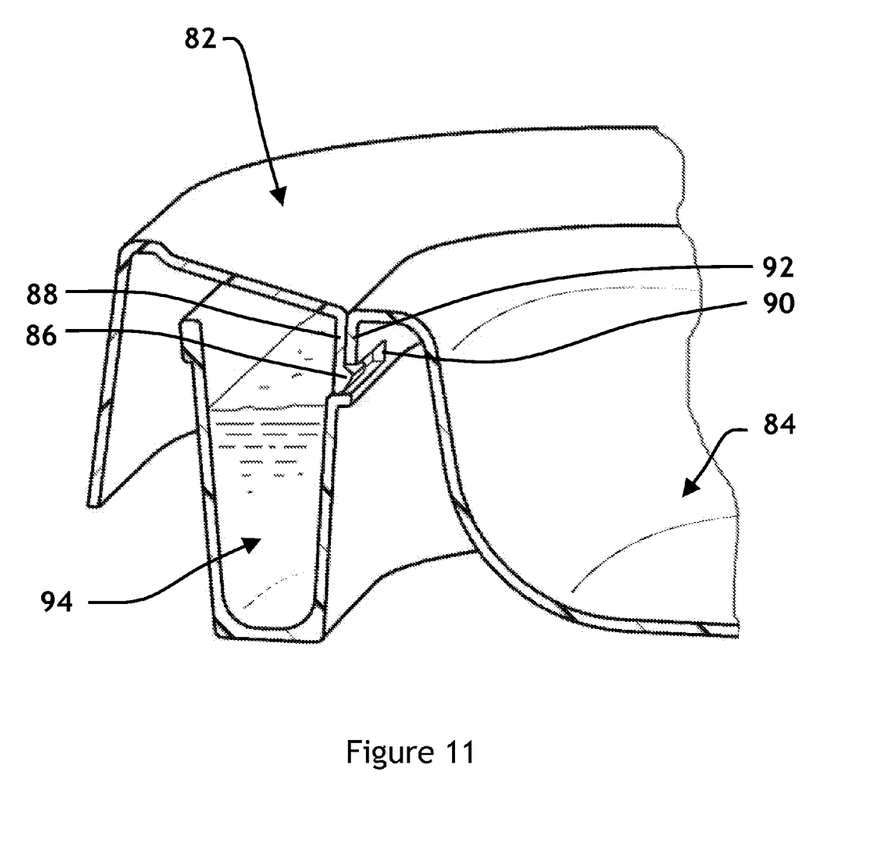
FIG. 11 illustrates in cross-sectional view the first embodiment of the present invention, incorporating an optional retaining mechanism

A possible retaining mechanism is incorporated in FIG. 11. In this alternative embodiment, the shroud 82 is positively retained to the bowl 84. This is achieved by means of a protrusion 86 on the inner wall of the shroud 88, which snaps into a corresponding recess 90 on the inner wall 92 of the integrally formed reservoir 94. The forms may be placed along the interface between the shroud 82 and bowl 84, and applied to any embodiments of the invention.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

In any claims that follow and in the summary of the invention, except where the context requires otherwise due to express language or necessary implication, the word "comprising" is used in the sense of "including", i.e. the features specified may be associated with further features in various embodiments of the invention.

The invention claimed is:

1. An animal food bowl for preventing access by crawling insects to the food contained therein by means of a liquid barrier, and furthermore limiting access by crawling insects to the food displaced outside of the internal food dish area by means of an overlying catchment shroud, characterized by:
   a. an internal food dish having a bottom and generally vertically extending sidewalls; and
   b. surrounded by a reservoir having a base and generally vertically extending inner and outer sidewalls, adapted to hold a liquid therein and as such acting as a barrier that inhibits crossing by crawling insects; and
   c. an overlying shroud extending substantially horizontally outward from the upper perimeter of the internal dish sidewalls to beyond the outer wall of the reservoir, so as to function as both a cover to conceal the reservoir and a substantially wide catchment surface for food displaced beyond the internal dish sidewalls; and
   d. the outward edge of the said catchment surface extends downwards as an outermost skirt, spaced outside of the outer reservoir wall, and extending substantially below and thus fully concealing the opening of the reservoir, so as to inhibit debris from entering or bridging the reservoir barrier from a horizontal approach and to inhibit evaporation of the liquid in the reservoir; and
   e. the top face of the said shroud catchment surface also slopes downwards towards the top of the internal dish sidewalls, so as to encourage any displaced food that accumulates on the shroud catchment surface, back into the dish, and furthermore encourages condensation formed on the underside of the said shroud catchment surface, to return to the reservoir.

2. An animal food bowl according to claim 1, characterized in that the said dish and said reservoir are formed as a single component, whilst the said shroud is an individually formed component and assembled thereto.

3. An animal food bowl according claim 2 characterized in that, the reservoir is positioned below and outwardly of an outer wall of the dish, the outer wall of the dish and the reservoir being connected by a ledge whereby an inner wall of the shroud sits on the ledge and is a close fit against the outer wall of the dish.

4. An animal food bowl according to claim 2, characterized wherein the said dish includes an internal ledge from which extends, a vertical upper wall section, and wherein said shroud sits on the internal ledge and is a close fit against the inner surface of the upper wall section of the dish.

5. An animal food bowl according to claim 1, characterized in that, a side wall of the dish is spaced from an inner wall of the reservoir, and optionally includes strengthening forms extending therebetween at intervals around the dish.

6. An animal food bowl according to claim 1, characterized in that, that the reservoir has a high aspect ratio and is constructed such that the surface area of liquid held in the reservoir is modest relative to the overall depth of the liquid.

7. An animal food bowl according to claim 1, characterized in that, the outer side wall of the reservoir is inclined outwardly to thereby discourage insects from scaling the wall to enter the reservoir.

8. An animal food bowl according to claim 1, characterized in that the individual components are positively retained to each other by means of co-operating forms or recesses on the component walls which snap into corresponding forms or recesses on the walls of a mating component.

9. An animal food bowl according to claim 1, characterized in that said bowl includes internal partitions.

10. An animal food bowl according to claim 1, characterized in that, the pet food bowl of the invention may include a means of stabilising the bowl against overturing or spillage in the form of a reservoir having a double skin outermost wall that leads to a horizontally projecting lowermost stabilising lip in which the shroud extends over the double skin wall and is spaced therefrom, and is also spaced from and not in contact with the lip.

11. An animal food bowl according to claim 1, characterized in that, the pet food bowl of the invention may include a means of stabilising the bowl against overturing and spillage in the form of rubberised feet attached to a base the bowl or reservoir to thereby create frictional resitance to movement on the ground.

12. An animal food bowl according to claim 1, characterized in that the outermost edge of the said shroud catchment surface includes a protruding form that further prevents any displaced food which may accumulate on the catchment surface, from moving off the catchment surface and falling beyond the reservoir barrier.

13. An animal food bowl according to claim 1, characterized in that the scope of the invention can be represented and assembled in any general profile including round, oval, quadrilateral, or other indistinct shapes.

14. An animal food bowl according to claim 1, characterized in that the said dish and said shroud are formed as a single component, whilst the said reservoir is an individually formed component and assembled thereto.

* * * * *